UNITED STATES PATENT OFFICE.

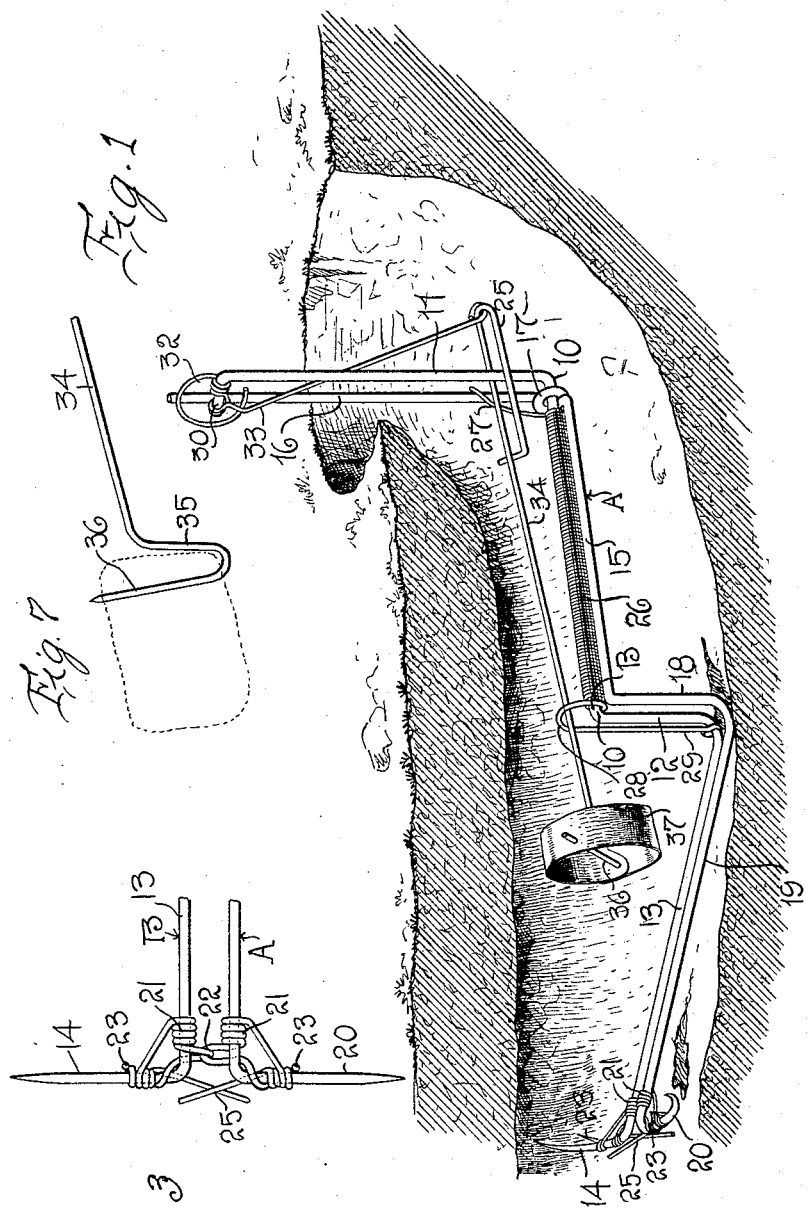

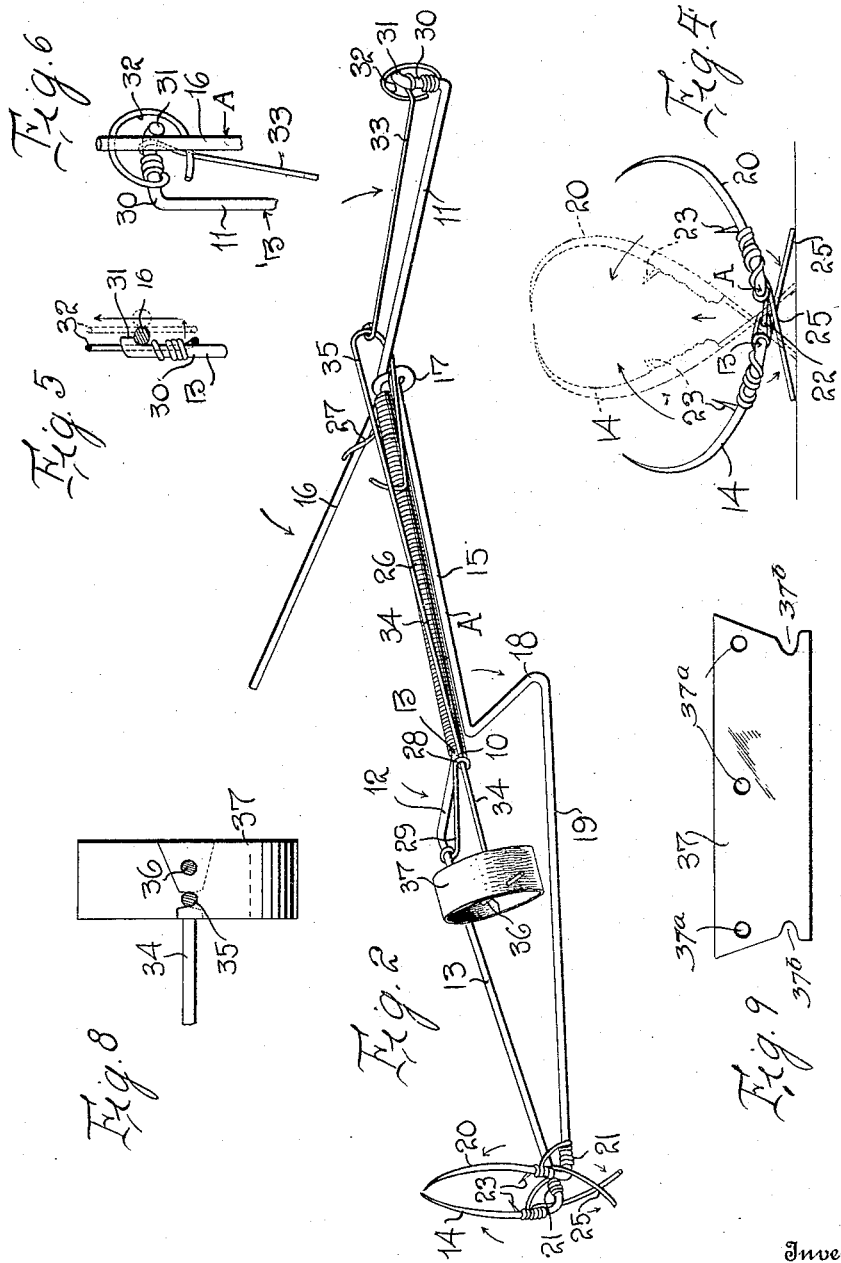

JUDSON C. PEWTHER, OF OSWEGO, OREGON.

ANIMAL-TRAP.

1,205,388.   Specification of Letters Patent.   Patented Nov. 21, 1916.

Application filed January 3, 1916. Serial No. 69,907.

*To all whom it may concern:*

Be it known that I, JUDSON C. PEWTHER, a citizen of the United States, residing at Oswego, in the county of Clackamas and State of Oregon, have invented certain new and useful Improvements in Animal-Traps, of which the following is a specification, reference being had to the accompanying drawings.

My invention relates to animal traps, and particularly to traps designed for catching small burrowing animals.

One of the objects of my invention is the provision of a trap so shaped and formed that it can be set in a more or less crooked hole or burrow without the necessity of straightening out the hole by digging.

A further object of the invention is to provide means whereby when the jaws of the trap are sprung the jaws will jump upward from the bottom of the hole or burrow as they approach each other.

Still another object of the invention is to provide a trip mechanism which releases the jaws of the trap by either a push or pull.

Still another object is to so construct the trap that it may be inserted within a hole and then set after such insertion, and in this connection to provide means whereby the trap may be readily sprung from the exterior of the hole and then withdrawn therefrom.

Another object of the invention is to provide improved bait supporting means so formed as to permit of thin or oblong bait being used and which will not permit the bait to be turned or readily come off.

Still another object is to provide a ring detachably mounted on the end of the trip or adapted to be used when bait is not used, and this ring-like member preventing the trap from being readily sprung by having loose dirt or sand pushed against the trigger or trip.

Other objects will appear in the course of the following description.

My invention is illustrated in the accompanying drawings, wherein:

Figure 1 is a sectional perspective view of a burrow showing my trap in place; Fig. 2 is a perspective view of the trap with the jaws closed; Fig. 3 is a top plan view of the jaws in their open position; Fig. 4 is an end view of the jaws as they close, the figure showing in dotted lines the closed position of the jaws; Fig. 5 is a top plan view of the latching mechanism, the rod 16 being in section; Fig. 6 is a perspective detail view of the latching mechanism; Fig. 7 is a plan view of the bait engaging hook, the bait being shown in dotted lines; Fig. 8 is a side elevation of the ring 37, the hook 35 being in section; and Fig. 9 is a plan view of the blank from which the ring 37 is formed.

Referring to these drawings it will be seen that my improved trap consists of two members A and B. Each of these members comprises longitudinally extending jaw shanks. One of these jaw shanks has a straight portion 10 which at its rear end is laterally bent as at 11 and which at its other end is laterally bent as at 12, the extension 11 being much longer than the bend 12. This bend 12 forms a crank arm and the shank is extended from the end of the bend 12 forward and inward toward the axis of the portion 10, as at 13. At this point the shank is bent outward and upward to provide a curved jaw 14 having a piercing point. The opposite member A is formed with a longitudinally extending straight portion 15 which extends parallel to the portion 10 and at its rear end with the laterally extending arm or extension 16 corresponding to the arm or extension 11. The wire or metal forming the portions 15 and 16 is coiled once around the portion 10 at the extremity adjacent the arm 11 as at 17 so as to rotatably connect the members A and B to each other. At the forward end of the portion 15 the member A is outwardly bent or angularly bent as at 18 to form a crank arm corresponding to the crank arm 12, and from the outer end of this arm extends the portion 19 which is in convergent relation to the portion 13 of the member B. This portion 19 at its extremity is bent to form the curved jaw 20 corresponding to the jaw 14.

At their forward ends the portions 13 and 19 are rotatably connected to each other in any suitable manner but preferably so that when the jaws come together the jaws will spring bodily upward. To this end I have shown the members 19 and 13 as being provided with coils 21, the coils being formed with inter-engaging loops 22, one end of each coil being carried across and coiled around the corresponding jaw and formed to provide prongs 23. The other end of the coil on the jaw is extended across the pivotal axis of the jaw as at 25, these portions 25 crossing each other. When the jaws are opened these portions 25 will lie practically in a plane with the jaws or in alinement therewith. When, however, the jaws are closed these portions 25 will be thrown downward to the position shown in Fig. 2 and thus lift the jaw end of the trap upward. I do not wish to be limited to the particular manner of forming these jaws to pivotally connect them to each other and provide the extensions 25.

Surrounding the portion 10 of the member B is a coiled spring 26, the rear end of which is laterally extended as at 27 and engaged with the arm 16. The other end of the coiled spring is bent to form a loop 28, then extended laterally in line with the crank arm 12 and engaged with the extremity thereof or with the end of the portion 13, as at 29. This spring acts to force the jaws together and force the arms 16 and 11 into a divergent relation. When the arms 16 and 11 are brought into an approximately parallel relation the rods forming the jaw shanks will be disposed in parallel relation as illustrated in Fig. 1 and the jaws will be forced apart. When the trip to be hereafter described is released, however, the spring 10 will act to throw the arms 11 and 16 into divergent relation and will also throw the crank arms 12 and 18 into divergent relation and the jaws together.

The mechanism for tripping the trap is as follows: One end of the portion 11 is laterally bent, as at 30, transversely of the axis of the trap and the extremity of this lateral bend 30 is rearwardly bent to a slight degree as at 31. Mounted upon the laterally bent portion 30 is a trip member 32 which is preferably in the general form of a circle, and from this trip member extends an arm 33. As illustrated, this trip member consists of a rod coiled around the lateral extension 30 and one end of which is bent to form the portion 32 while the other end is bent downward to form the arm 33. At its lower end this arm 33 is operatively connected to a rod 34. The rear extremity of this rod is formed with an elongated loop 35 which embraces the arm 11 and guides the rod longitudinally upon the arm. At its forward end this rod 34 is bent to form a hook portion 35 rather elongated and having a bill 36 extending transversely of the trap and beyond the line of the rod 34. Mounted upon the hook portion 35 is an annular member 37 of thin sheet metal which is disposed upon the hook portion so that its thin edge is presented toward the forward end of the trap. This annular member is removably disposed upon the hook portion and when bait is used this annular member is not used. The annular member is formed with perforations 37$^a$ for the passage of the bill 36 of the hook and the bend of the hook engages with the registering notches 37$^b$ as illustrated in Fig. 8. The member 37 may thus be slipped off the bill of the hook or slipped back on again.

In order to set the trap the arms 11 and 16 are drawn upward to a position approximately parallel to each other and the arm 11 is engaged with the inwardly turned end 31 of the extension 30. The forcing of the arms 11 and 16 into parallel relation is against the tension of the spring 26 and opens the jaws of the trap. When the arm 16 is engaged with the end of the extension 30 of the arm 11, the loop or trip 32 will be disposed against the face of the arm. Now, under these circumstances, if the rod 34 be either pushed or pulled the trip 32 will rotate and disengage the arm 16 from its engagement with the end 31 and the spring will cause the jaws to close. The same time that the jaws close the extensions 22 of the jaws will cause the jaws to spring upward.

Particular attention is called to the fact that when the members A and B are relatively rotated so as to set the trap, the crank arms 18 and 29 will be disposed in parallel relation to each other and the arms 13 and 19 will also be disposed into parallel relation. This bending of the arms 18 and 12 and the inclination of the parts 13 and 19 with relation to the arms makes it possible to set the trap in a crooked burrow as illustrated in Fig. 1. This is a most important point of my invention as it permits the trap to be set without the necessity of straightening the burrow by digging. A further very important point of the device consists in the fact that the trap may be inserted within the burrow and then set by drawing together the arms 11 and 16, which occurs by reason of the fact that the arms 11 and 16 may be drawn together before or while the trap is being disposed within the burrow. The trip mechanism releases the trap either by a push or pull. Thus an animal nibbling at the bait and pulling it will cause the trap to spring or the trap may be sprung by an animal pushing loose dirt against the end of the trip rod 34. The extensions 25 cause the jaw end of the trap to jump up from the bottom of the burrow as the jaws approach each other and this makes the trap much more effective in action. The ring or annular member 37 is detachably mounted upon the end of the trip rod so that it may be used where bait is useless or inadvisable and it prevents the trap from being so readily sprung by having loose dirt or sand pushed against the trip rod. The peculiar shape of the bait holder on the end of the trip rod is also of importance. This peculiar shape permits of thin or relatively oblong bait being used as it does not permit the bait to be turned or readily come off. The bait wedges into the bight of the loop 35.

It is to be noted that when the trap hereinbefore described is set, it comprises a body formed of two longitudinally extending bars, these bars being bent so as to provide the vertical portions 16 and 11, the horizontal portion 15, the vertical portions 12 and 18, and the angularly directed portions 13 and 19. These portions constitute a series of successive longitudinal axial bends, and the different portions, namely, the upwardly extending portions 11 and 16, the straight portion 15, the downwardly extending portions 12 and 18, the longitudinally extending portions 12 and 19, are disposed in stepped relation to each other. Now the advantage of this is that the trap may be inserted in a burrow, where if the trap simply consisted of a straight body the trap would not be adapted to be placed in a burrow unless the mouth of the burrow was wide. By making the several bends, however, as before stated, it is possible to insert the trap even in a narrow-mouthed burrow. The trap may be readily passed between the walls at the mouth of the burrow and even if the floor of the burrow rises, or if the opening of the burrow is not exactly at right angles, or is irregular, the trap may be inserted in the burrow.

While I have illustrated what I have found to be a most effective form of my trap and one that may be very cheaply made, it is obvious that many modifications might be made in the details of construction without departing from the spirit of the invention and I do not wish to limit myself to the details illustrated.

Having described my invention, what I claim is:

1. An animal trap having a body formed of longitudinally extending parallel jaw shanks operatively connected to each other for relative rotation, coacting jaws at one end of the body, each jaw being connected to one of the shanks, and operating extensions at the other end of the body each connected to one of the shanks, a latching device carried upon one extension and engaging the other extension, and a tripping mechanism mounted upon the body relatively adjacent the jaws and operatively connected to the latching device.

2. An animal trap having longitudinally extending jaw shanks angularly bent intermediate their ends, the jaw shanks being rotatably engaged with each other, jaws carried upon one end of the shanks, operating members extending at an angle to the other ends of the shanks, and a latching mechanism disposed upon the ends of said angularly extending members.

3. An animal trap including two parallel rods, means for relatively rotating the rods with relation to each other, jaws each carried upon one end of each rod, angular extensions at the other ends of the rods, a spring urging the relative rotation of the rods to bring the jaws into engagement with each other, means mounted upon the ends of the angular extensions for latching the rods with the jaws in an open position against the tension of the spring, and a trip mechanism supported intermediate of the rods and adapted when actuated to disengage said latching means.

4. An animal trap including two longitudinally extending rods having parallel portions engaged with each other for relative rotation and forming the body of the trap, the rods at one end of said parallel portions being angularly bent to form actuating arms, the rods at the other end of the parallel portions being bent to form crank arms extending in an opposite direction to the actuating arms, the rods being extended from the ends of the crank arms, convergent toward each other and the common axis of the rods and at the extremities being bent to form opposed jaws, a spring for relatively rotating the rods to carry the jaws to a closed position, means for latching the rods with the jaws in an open position, and animal actuating means for tripping said actuating means.

5. In an animal trap, longitudinally extending jaw shanks, jaws at one end of the shanks and operating extensions on the other ends of the shanks disposed at right angles to the length of the jaw shank and at right angles to the jaws whereby when said extensions are brought together the jaws will be opened, means urging the jaws toward each other, means for latching the jaws in an open position, and animal actuated means for releasing the jaws.

6. An animal trap having a body composed of a pair of longitudinally extending rods, each rod having a series of longitudinal axial bends, the rods being hingedly connected to each other, one end of each rod carrying a jaw, the bends of the body of the trap when set providing longitudinally extending stepped portions, means for holding the jaws in an open position, and animal actuated releasing means for said jaws.

7. In a trap, a pair of approximately parallel rods rotatably mounted in relation to each other, a pair of jaws mounted upon the ends of said rods, a spring urging the rods to a rotative position where the jaws will be open, means for latching the jaws in their open position, and means for tripping said latching means, said jaws having extensions on their abutting ends projecting each toward the other jaw and crossing each other, said extensions when the jaws are opened being disposed in parallel relation but when the jaws are closed being disposed in a downward and outward relation to thereby cause the jaws to be lifted when the trap is sprung.

8. In a trap of the character described, a tripping rod having a bait engaging hook at one end, the hook having a bill extending transversely of the rod, and an annular member detachably mounted upon said hook and bill, the annular member having its axis parallel to the axis of the rod.

9. In a trap of the character described, a pair of rods having parallel portions engaged with each other for relative rotation, said parallel portions at one end being bent to form laterally extending actuating arms and at their other ends being bent to form laterally extending crank arms, the rods being extended from the ends of the crank arms toward each other and the common axis of the rods and at their extremities being upwardly bent to provide opposed jaws rotatably engaged with each other, and a spring surrounding one of said rods and operatively engaged with the other rod to normally urge said crank arms into a divergent position, means for detachably holding the operating arms in a parallel position, a trip device rotatably mounted upon one of said operating arms and adapted to release the engagement between the operating arms, said trip device including an arm extending parallel to one of the operating arms.

In testimony whereof I hereunto affix my signature in the presence of two witnesses.

JUDSON C. PEWTHER.

Witnesses:
CARL A. GLOECKLER,
JAMES A. DUNN.

Copies of this patent may be obtained for five cents each, by addressing the "Commissioner of Patents, Washington, D. C."